United States Patent
Vargantwar et al.

(10) Patent No.: US 8,457,050 B1
(45) Date of Patent: Jun. 4, 2013

(54) SELECTION OF WIRELESS COMMUNICATION OVERHEAD MESSAGING RESOURCES BASED UPON PRESENT CONDITIONS

(75) Inventors: Sachin R. Vargantwar, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 782 days.

(21) Appl. No.: 12/561,363

(22) Filed: Sep. 17, 2009

(51) Int. Cl.
*H04W 4/00* (2009.01)

(52) U.S. Cl.
USPC .......................................... 370/328; 370/329

(58) Field of Classification Search
USPC .................................................. 370/328, 329
See application file for complete search history.

(56) References Cited

U.S. PATENT DOCUMENTS

| | | | |
|---|---|---|---|
| 5,953,665 A | 9/1999 | Mattila | |
| 6,185,422 B1 | 2/2001 | Mattila | |
| 6,542,745 B1 * | 4/2003 | Mottier et al. | 455/441 |
| 7,653,028 B2 * | 1/2010 | Shiu et al. | 370/335 |
| 7,889,702 B2 * | 2/2011 | Proctor, Jr. | 370/335 |
| 2005/0181799 A1 * | 8/2005 | Laroia et al. | 455/450 |
| 2007/0230405 A1 * | 10/2007 | Yin et al. | 370/335 |
| 2007/0248042 A1 * | 10/2007 | Harikumar et al. | 370/329 |

* cited by examiner

*Primary Examiner* — Mark Rinehart
*Assistant Examiner* — Angel Brockman

(57) ABSTRACT

What is disclosed is a method of operating a wireless communication device to select an overhead time cycle of a series of repeating overhead time cycles associated with a wireless access node, where each overhead time cycle comprises a plurality of time slots, and where the wireless access node transfers overhead information during individual ones of the time slots. The method includes receiving correlation information for each of the overhead time cycles, where the correlation information associates a noise range with each of the overhead time cycles. The method also includes determining a noise level at the wireless communication device of wireless communications of the wireless access node, processing the noise level and the correlation information to select one of the overhead time cycles, monitoring the time slots of the selected one of the overhead time cycles for the overhead information from the wireless access node, and ignoring the time slots during the non-selected overhead time cycles.

20 Claims, 7 Drawing Sheets

TABLE 501

| WCD | SNR | SELECTED CONTROL CYCLE | ASSOCIATED DATA RATE |
|---|---|---|---|
| 310 | 42 | 4 | MEDIUM |
| 311 | 15 | 1 | LOW |
| 312 | 120 | 12 | HIGH |

TABLE 500

| NOISE RANGE | CONTROL CYCLE | DATA RATE |
|---|---|---|
| 10-19 | 1 | LOW |
| 20-29 | 2 | LOW |
| 30-39 | 3 | LOW |
| 40-49 | 4 | MEDIUM |
| 50-59 | 5 | MEDIUM |
| ... | ... | ... |
| 120-129 | 12 | HIGH |

FIGURE 5

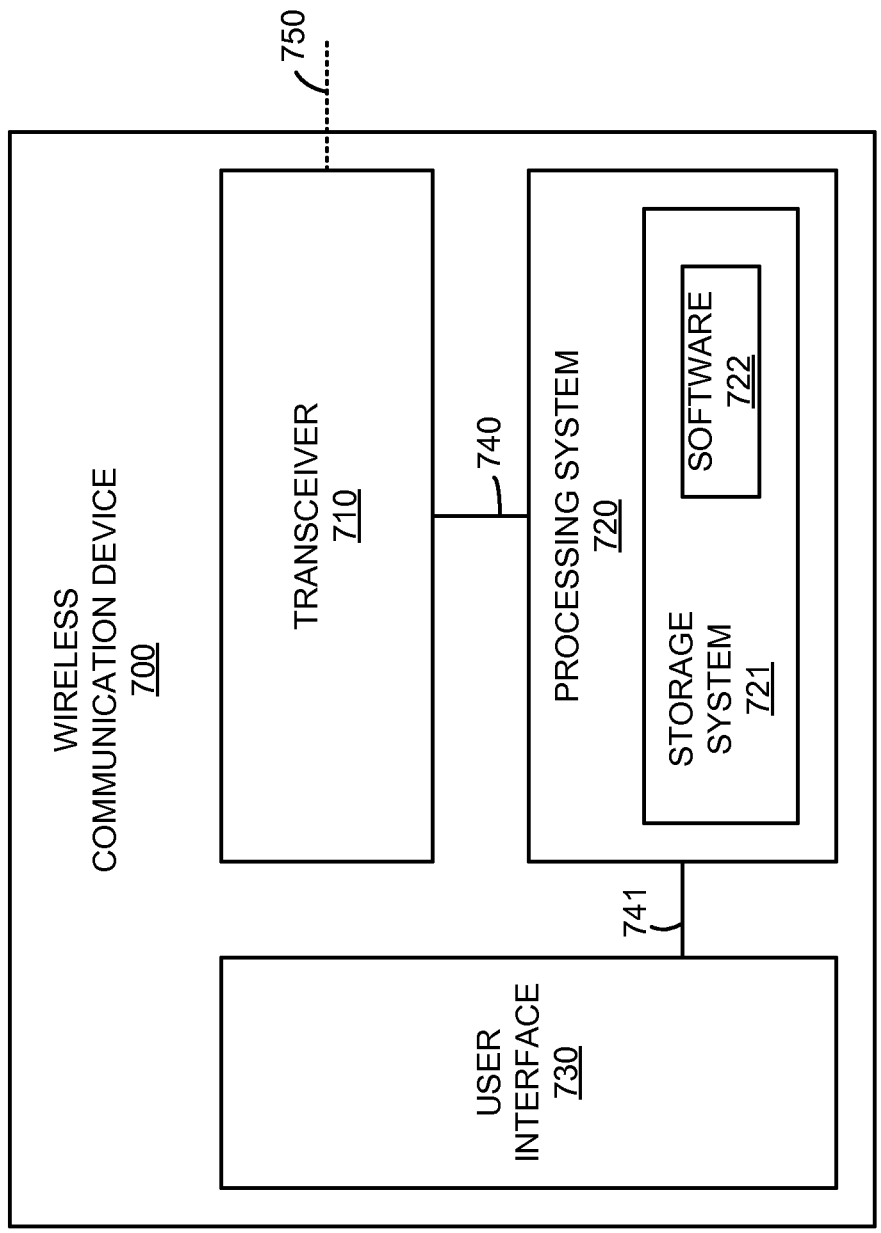

SELECTION OF WIRELESS COMMUNICATION OVERHEAD MESSAGING RESOURCES BASED UPON PRESENT CONDITIONS

TECHNICAL FIELD

Aspects of the disclosure are related to the field of communications, and in particular, the selection of wireless communication overhead messaging resources in wireless communication networks.

TECHNICAL BACKGROUND

Wireless communication networks typically include wireless communication devices which, via a wireless communication system, communicate with further communication networks and equipment. The wireless communication system typically includes wireless access nodes and associated equipment to route communications over wireless links from the wireless communication devices to further communication networks, equipment, and destinations.

When wireless communication devices desire to initiate communication services with the wireless communication system, a registration process typically occurs. As a part of this registration process, the wireless communication devices are configured to receive overhead information via a randomly assigned overhead messaging cycle carried over a portion of the wireless links. The overhead information typically includes non-user communications and commands related to the underlying operation of the particular wireless communication protocol employed over the wireless links. However, the overhead information is typically transferred in an inefficient format to accommodate wireless communication devices experiencing different environments, motion, positions, or other conditions. Unfortunately, these overhead communications can consume a large portion of the limited resources of the wireless links.

OVERVIEW

What is disclosed is a method of operating a wireless communication device to select an overhead time cycle of a series of repeating overhead time cycles associated with a wireless access node, where each overhead time cycle comprises a plurality of time slots, and where the wireless access node transfers overhead information during individual ones of the time slots. The method includes receiving correlation information for each of the overhead time cycles, where the correlation information associates a noise range with each of the overhead time cycles. The method also includes determining a noise level at the wireless communication device of wireless communications of the wireless access node, processing the noise level and the correlation information to select one of the overhead time cycles, monitoring the time slots of the selected one of the overhead time cycles for the overhead information from the wireless access node, and ignoring the time slots during the non-selected overhead time cycles.

What is also disclosed is a wireless communication device configured to select an overhead time cycle of a series of repeating overhead time cycles associated with a wireless access node, where each overhead time cycle comprises a plurality of time slots, and where the wireless access node transfers overhead information during individual ones of the time slots. The wireless communication device includes a transceiver configured to receive correlation information for each of the overhead time cycles, where the correlation information associates a noise range with each of the overhead time cycles. The wireless communication device also includes a processing system configured to determine a noise level at the wireless communication device of wireless communications of the wireless access node, and process the noise level and the correlation information to select one of the overhead time cycles. The transceiver is also configured to monitor the time slots of the selected one of the overhead time cycles for the overhead information from the wireless access node, and ignore the time slots during the non-selected overhead time cycles.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 5 includes tables illustrating example noise correlations of wireless communication devices.

FIG. 7 is a block diagram illustrating a wireless communication device.

DETAILED DESCRIPTION

Figure 1:
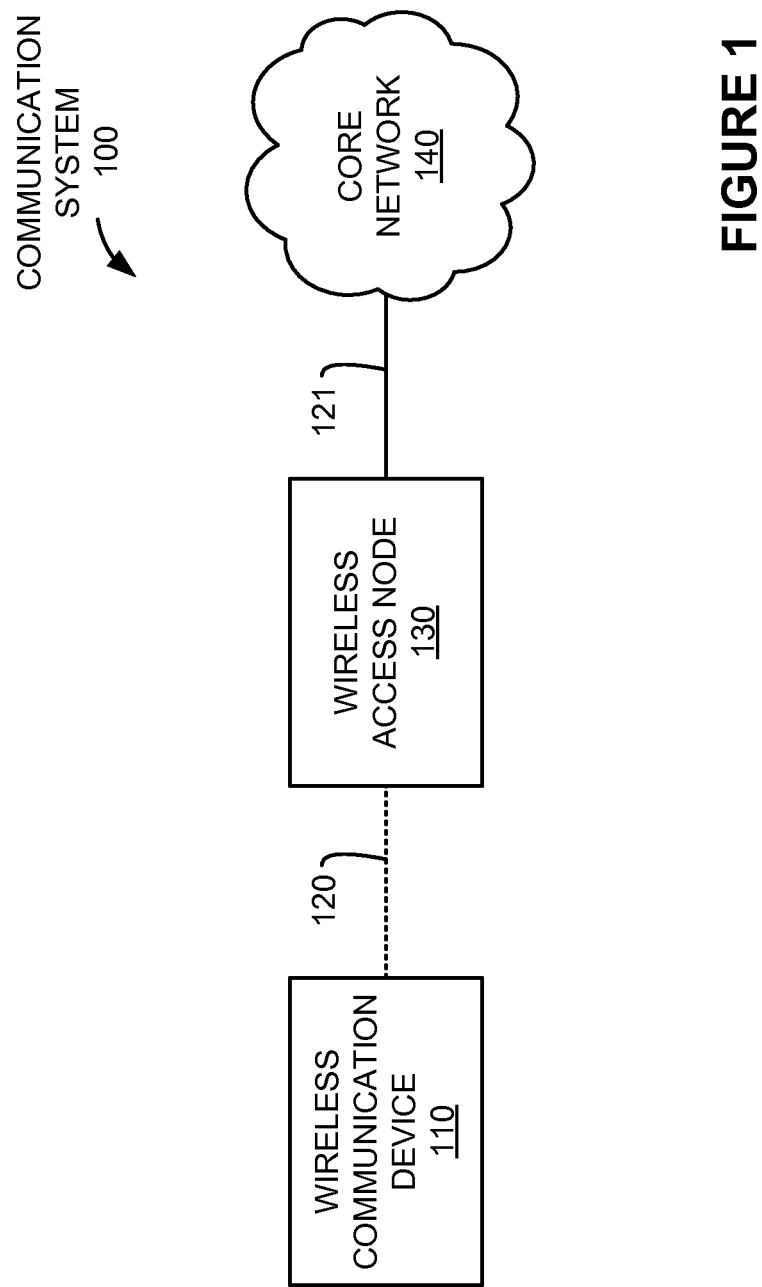
FIG. 1 is a system diagram illustrating a communication system.

FIG. 1 is a system diagram illustrating communication system 100. Communication system 100 includes wireless communication device 110, wireless access node 130, and core network 140. Wireless communication device 110 and wireless access node 130 communicate over wireless link 120. Wireless access node 130 and core network 140 communicate over link 121.

In FIG. 1, wireless communication device 110 and wireless access node 130 exchange wireless communications over wireless link 120. These wireless communications can include overhead communications and user communications, as well as other types of communications. The overhead communications include information relating to non-user communications, paging, and commands related to the operation of the particular wireless communication protocol employed over wireless link 120. Examples of overhead information include communication channel arrangement and assignments, downlink and uplink mappings, frame control, preambles, pilot channels, beacon signals, paging information, among other information. Also in FIG. 1, wireless access node 130 is configured to exchange the overhead information with wireless communication device 110 in a series of repeating overhead time cycles. In typical examples, each overhead time cycle includes a plurality of time slots, and wireless access node 130 transfers overhead information during individual ones of the time slots.

Figure 2:
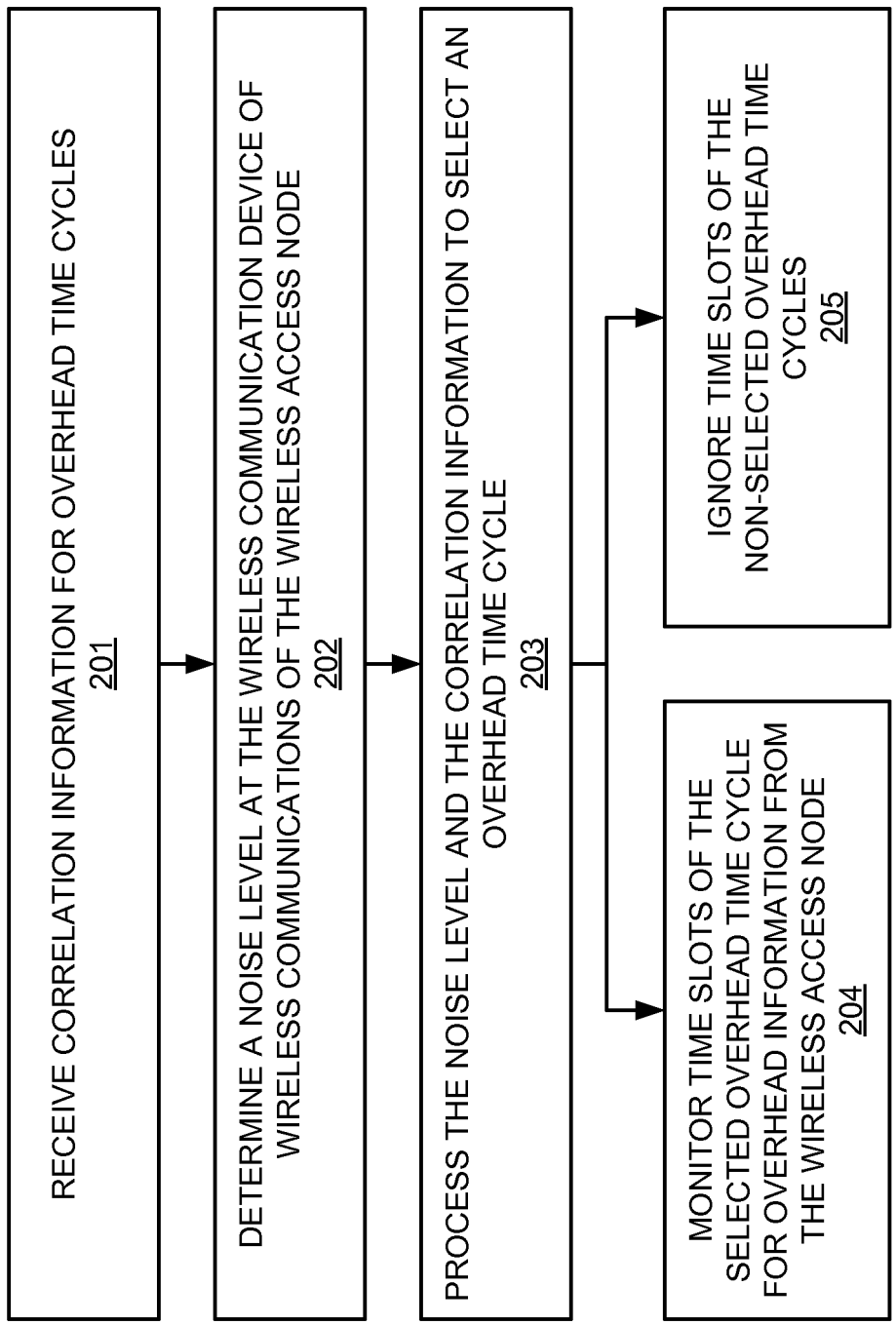
FIG. 2 is a flow diagram illustrating a method of operation of a wireless communication device.

FIG. 2 is a flow diagram illustrating a method of operation of wireless communication device 110 to select an overhead time cycle of a series of repeating overhead time cycles associated with wireless access node 130, where each overhead time cycle comprises a plurality of time slots, and where wireless access node 130 transfers overhead information during individual ones of the time slots. The operations of FIG. 2 are referenced herein parenthetically.

In FIG. 2, wireless communication device 110 receives (201) correlation information for overhead time cycles. In some examples, this correlation information could be received over wireless link 120 from wireless access node 130. In other examples, the correlation information is received by wireless communication device 110 during a setup or initial registration of wireless communication device 110 with wireless access node 130, or other wireless access nodes. The correlation information includes information which correlates each overhead time cycle to a noise level. In some examples, the correlation information could include a series of noise ranges, where each noise range corresponds to a particular overhead time cycle, although other configurations could be employed.

Wireless communication device 110 determines (202) a noise level at wireless communication device 110 of wireless communications of wireless access node 130. The wireless communications could be other overhead communications, registration communications, or user communications as detected at wireless communication device 110. Wireless communication device 110 then processes (203) the noise level and the correlation information to select an overhead time cycle. Wireless communication device 110 monitors (204) time slots of the selected overhead time cycle for overhead information from wireless access node 130, and ignores (205) time slots of the non-selected overhead time cycles. In some examples, wireless communication device 110 also transfers overhead information during the time slots of the selected overhead time cycle.

Referring back to FIG. 1, wireless communication device 110 comprises radio frequency (RF) communication circuitry and an antenna. The RF communication circuitry typically includes amplifiers, filters, modulators, and signal processing circuitry. In many examples, wireless communication device 110 includes circuitry and equipment to exchange overhead communications and user communications with wireless access node 130 over wireless link 120. Wireless communication device 110 may also include a user interface, memory device, computer-readable storage medium, software, processing circuitry, or some other communication components. Wireless communication device 110 may be a telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be in communication with wireless access node 130.

Wireless access node 130 comprises RF communication and control circuitry and an antenna. The RF communication circuitry typically includes amplifiers, filters, RF modulators, and signal processing circuitry. In many examples, wireless access node 130 includes equipment to exchange overhead communications and user communications with wireless communication device 110 over wireless link 120, and route user communications between core network 140 and wireless communication device 110. Wireless access node 130 may also comprise a router, server, memory device, software, processing circuitry, cabling, power supply, network communication interface, physical structural support, or some other communication apparatus. Wireless access node 130 could be a base station, base transceiver station, Internet access node, telephony service node, wireless data access point, or some other wireless communication equipment, including combinations thereof. In typical examples, wireless access node 130 has a limited geographic coverage area over which it can provide communication services to wireless communication devices.

Core network 140 comprises the core network of a wireless communications provider, and could include routers, gateways, telecommunication switches, processing systems, or other communications equipment and systems for providing communication and data services. Core network 140 may also comprise optical networks, asynchronous transfer mode (ATM) networks, packet networks, metropolitan-area networks (MAN), or other network topologies, equipment, or systems, including combinations thereof. In some examples, core network 140 includes further wireless access nodes and associated equipment for providing communication services to many wireless communication devices across a geographic region.

Wireless link 120 uses the air or space as the transport media. Wireless link 120 may use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication link 121 uses metal, glass, optical, air, space, or some other material as the transport media. Communication link 121 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-121 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication link 121 could be a direct link or may include intermediate networks, systems, or devices. In many examples, the portion of wireless link 120 as transmitted by wireless communication device 110 is referred to an uplink or reverse link of the wireless link, while the portion as transmitted by wireless access node 130 is referred to as a downlink or forward link of the wireless link.

Figure 3:
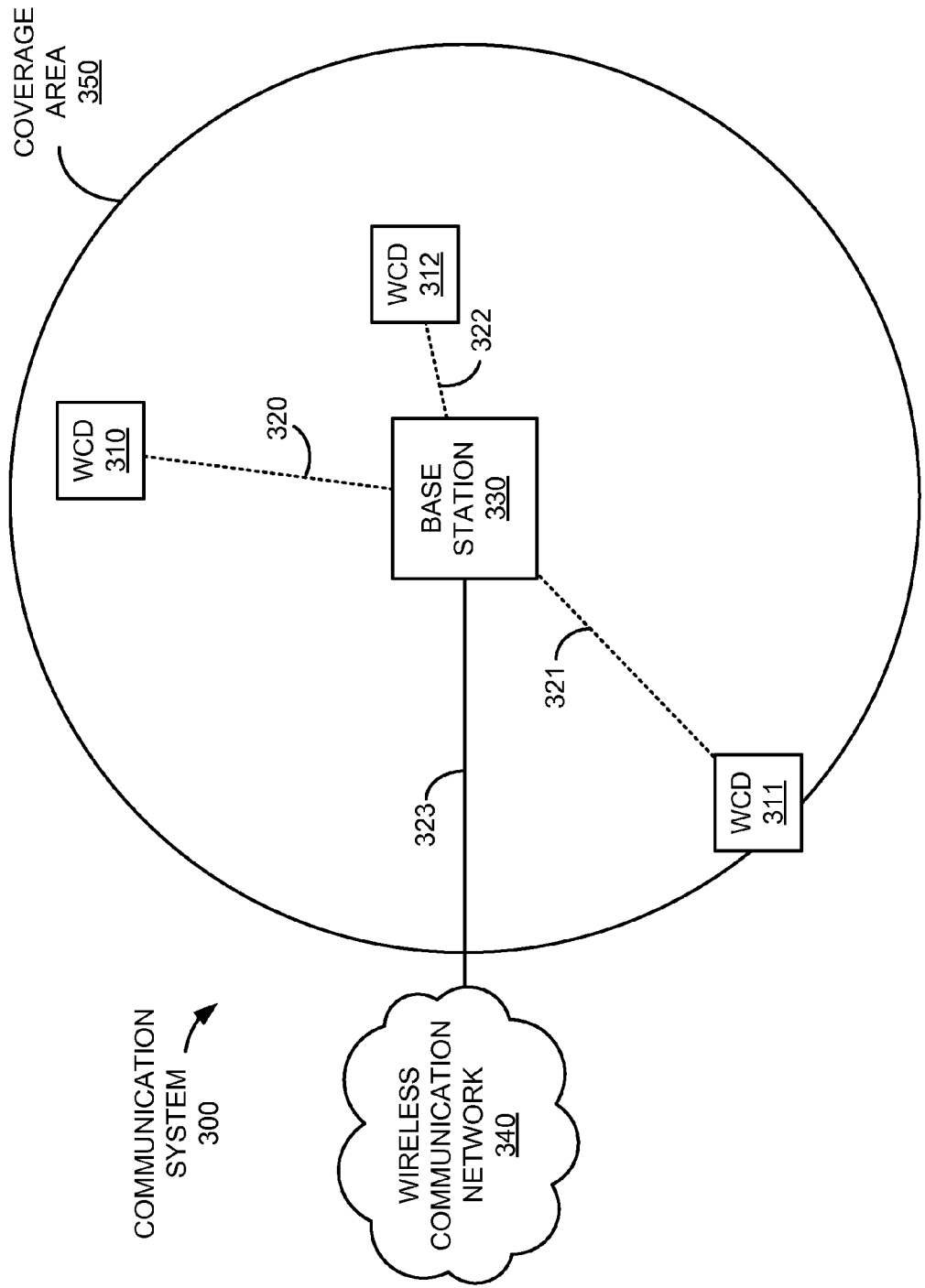
FIG. 3 is a system diagram illustrating a communication system.

FIG. 3 is a system diagram illustrating communication system 300. FIG. 3 is a diagram illustrating an example of communication system 100, as found in FIG. 1, although communication system 100 could use other configurations. Communication system 300 includes wireless communication devices (WCD) 310-312, base station 330, and wireless communication network 340. Wireless communication devices 310-312 communicate with base station 330 over wireless links 320-322, respectively. Base station 330 and wireless communication network 340 communicate over link 323.

Wireless communication devices (WCD) 310-312 are user devices, and comprise mobile wireless telephones in this example. Although three wireless communication devices are shown in FIG. 3, it should be understood that a different number of wireless communication devices could be included. Base station 330 comprises RF communication and control circuitry and an antenna, and includes wireless access node equipment capable of communicating with and providing communication service to wireless communication devices 310-312. Wireless communication network 340 is a core network of a wireless communications provider in this example. Wireless communication network 340 could include further base stations, routers, gateways, controller systems, processing systems, or other communication equipment. Wireless links 320-322 employ the CDMA wireless protocol, and link 323 is a T1 link in this example. Also in this example, wireless links 320-322 are each used to exchange at least overhead communications.

As shown in FIG. 3, base station 330 has a limited geographic range over which it can provide communication services to wireless communication devices. The limited range is indicated by the circular-shaped wireless coverage area 350 in FIG. 3. Although a circular region defining the coverage area is shown in FIG. 3, it should be understood that the coverage area could be of other shapes and configurations, as determined by geographic features, empirical data, radio frequency (RF) conditions, the equipment of base station 330, or by other factors, including combinations thereof.

Base station 330 is configured to exchange overhead information with wireless communication devices 310-312 in a series of repeating overhead time cycles, where the overhead time cycles each include multi-user messages and single-user messages. In this example, a CDMA protocol is employed, and the multi-user messages could include access parameter messages (APM) and system parameter messages (SPM), and the single-user messages could include extended channel assignment messages (ECAM) and paging messages. It should be understood that in other examples of wireless communication protocols, different message types may be included. For example, in WiMAX protocols, the overhead information could include preambles, frame control information (FCH), downlink mapping (DL-MAP) and uplink mapping (UL-MAP) information, downlink (DCD) and uplink (UCD) overhead information channel descriptions, among other information.

The overhead information and user communications are, in typical examples, encoded using a modulation scheme. However, the modulation scheme typically employed for overhead information is of a low order of modulation, or of a less efficient type, to ensure that all wireless communication devices in communication with, and attempting to initiate communication through base station 330, can decode the overhead information properly. For example, a wireless communication device attempting to initiate communications through base station 330 must first perform a handshaking and ranging operation to register with base station 330. This handshaking and ranging operation includes receiving overhead information from base station 330, as well as transferring overhead information to base station 330. However, if the wireless communication device attempting to initiate communications does not know the modulation scheme employed for overhead communications for base station 330, the overhead information received from base station 330 can not be properly decoded or demodulated, nor can overhead information transferred to base station 330 be properly encoded or modulated.

Thus, a predetermined modulation scheme is employed, in typical examples, to allow all existing and initiating wireless communication devices to receive and decode the overhead information from base station 330. The predetermined modulation scheme is also, in typical examples, of a low "order" of modulation as well as of a less efficient "type" of modulation. This low order and low efficiency type of modulation scheme is selected to ensure that wireless communication devices both near to and far from base station 330 can properly exchange the overhead information.

For example, as the order of modulation increases, and consequently the potential bandwidth of communications, the distance over which wireless communications can reliably occur typically decreases. Likewise, as the type of modulation increases to a more efficient type, the distance over which communications can reliably occur also typically decreases. Unfortunately, using a predetermined modulation scheme of low order and type can lead to inefficient use of wireless links 320-322, as well as overcrowding of the resources of base station 330. This low order and type of modulation can also leave less available bandwidth for user communications, as a large portion of the available bandwidth must be dedicated to inefficiently modulated overhead communications.

In examples of wireless communication protocols, only certain types of modulation are supported by wireless communication systems and wireless communication devices. These modulation types can include quadrature-amplitude modulation (QAM), frequency-shift keying (FSK), phase-shift keying (PSK), quadrature phase shift keying (QPSK), among other encoding schemes. Also, within some types of modulation, a different order of modulation can exist. The order of modulation typically refers to the number of bits able to be transferred per unit symbol of the particular type of modulation scheme. For example, in the QAM type of modulation, an order of 64 would potentially allow for 64 bits of data for every encoded piece, or symbol, of communications, and would be referred to as 64-QAM. Other orders and types of modulation could have a similar representation.

In further examples, in addition to, or alternately from, the adjustable modulation scheme, an adjustable coding scheme could be employed for the overhead information. A coding scheme can indicate an error correction or encoding scheme to reduce data errors or add redundancy in communications. Some examples include error-correcting codes (ECC), checksums, forward-error correction (FEC), block coding, convolutional coding, and Reed-Solomon coding, among others. In many examples of FEC, redundant data bits are added into the communications to allow the recipient to validate the communications were properly received, or to aid in detection and correction of errors. The number of redundancy bits used could be varied based upon many factors, and in this example, could be based upon the signal quality information of the wireless communication devices, among other factors. If a lower number of redundancy bits in the FEC coding scheme could be tolerated by wireless communication devices, a coding scheme with a smaller percentage of redundant bits could be selected. Advantageously, this smaller percentage of redundant bits could free up bandwidth of the overhead portion of the wireless link for user communications and lead to a higher data rate.

Figure 4:
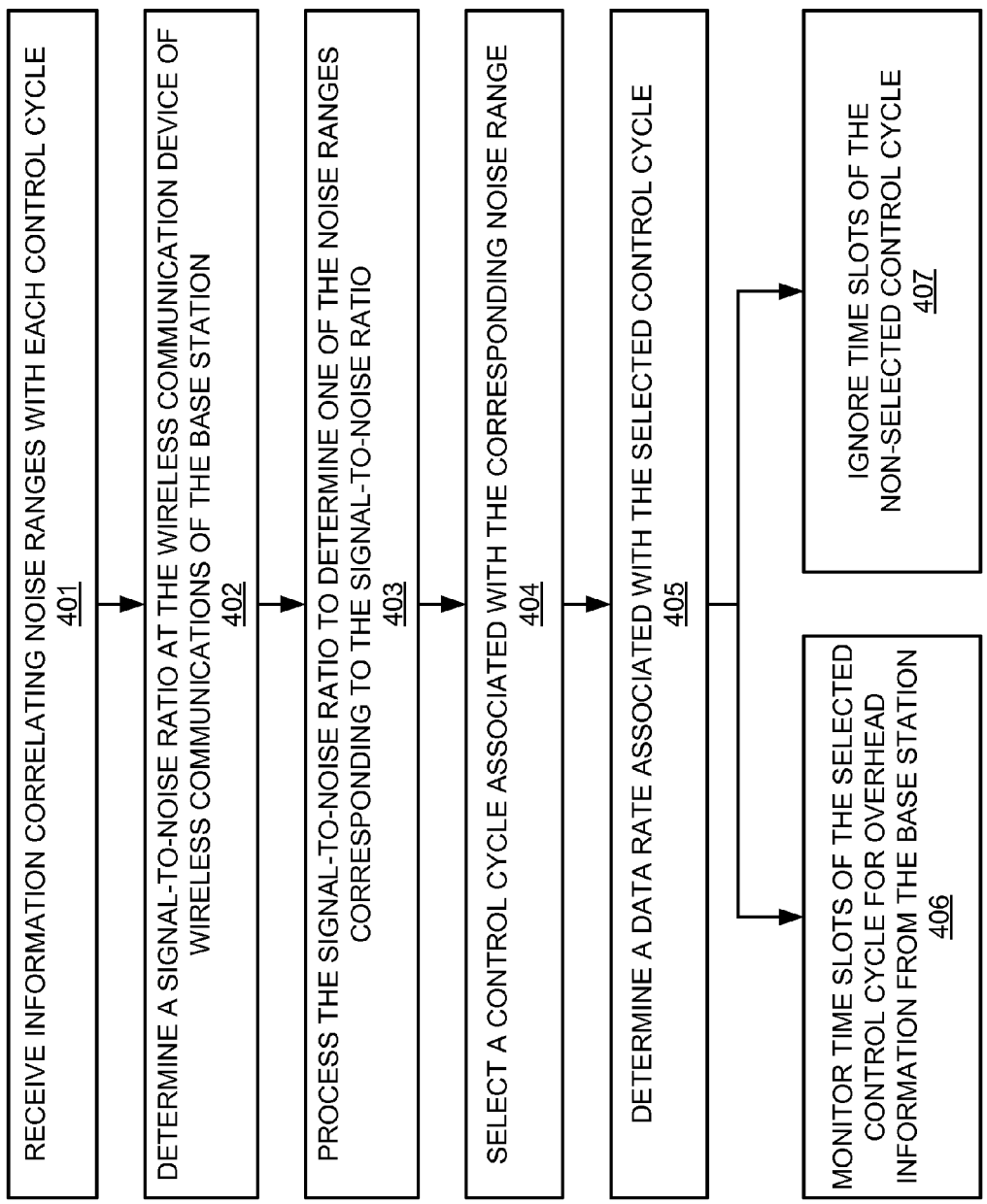
FIG. 4 is a flow diagram illustrating a method of operation of a wireless communication device.

FIG. 4 is a flow diagram illustrating a method of operation of wireless communication devices 310-311 to each select an overhead time cycle of a series of repeating overhead time cycles associated with base station 330, where each overhead time cycle comprises a plurality of time slots, and where base station 330 transfers overhead information during individual ones of the time slots. In this example, the overhead time cycles are control cycles of a control channel contained in a forward link portion of wireless links 320-322. Individual time slots of the control cycles are used to exchange overhead information in the CDMA protocol. A further description of an example forward link control channel can be found in FIG. 6, although other examples could be employed. The operations of FIG. 4 are referenced herein parenthetically.

In FIG. 4, wireless communication devices 310-312 each receive (401) information correlating noise ranges with each control cycle. In some examples, the information is received over overhead communications that are global or common to all wireless communication devices during registration with base station 330. In other examples, the information is transferred by base station 330 to individual ones of wireless communication devices 310-312 over wireless links 320-322. In yet other examples, the information is preprogrammed into wireless communication devices 310-312 prior to initiating communications with base station 330, or stored on a computer-readable medium in any of wireless communication devices 310-312 from a previous communication session.

The information correlating noise ranges with each control cycle includes information which associates noise ranges to a control cycle. For example, if five control cycles were employed, each of the five control cycles could have a noise range correlated thereto. Additionally, each control cycle could also have an associated data rate for the transfer of overhead information. This data rate could be conveyed by using different modulation schemes, modulation types, coding schemes, or other representations and data transfer methods. For example, FIG. 5 includes table 500 illustrating example noise correlations with 12 control cycles. In table 500, each of 12 increasing noise ranges in the first column is correlated with a control cycle and a data rate in the second and third columns, respectively. It should be understood that the actual values used in table 500 are merely illustrative, and may vary based upon the units, ranges, measured values, or other conditions. Noise ranges for control cycles 6-11 in table 500 are omitted for brevity and clarity.

Wireless communication devices 310-312 determine (402) a local signal-to-noise ratio (SNR) of wireless communications of base station 330. In this example, the SNR is individually determined by each of wireless communication devices 310-312 at their individual locations. The wireless communications of base station 330 could include overhead communications, beacon signals, pilot signals, or user communications, and could include communications transferred for other wireless communication devices. In some examples, a SNR is determined from forward link communications of base station 330. It should be understood that other representations of signal quality could be determined, such as a noise level, a noise rise, a channel signal to noise ratio, or other representations. In further examples, a distance is determined between the respective wireless communication device and base station 330. In distance examples, a wireless communication device could process a distance from base station 330 to estimate a noise level, or use a raw distance to correlate to each control cycle. The distance could be determined by processing geographic coordinates of base station 330 and of the respective wireless communication device. A global-positioning system (GPS) receiver or position determining equipment (PDE) could be employed by the wireless communication device or base station 330 to determine geographic coordinates.

Wireless communication devices 310-312 then process the SNR to determine (403) one of the noise ranges corresponding to the SNR. For example, FIG. 5 includes table 501 illustrating example noise levels (SNR) in each row for wireless communication devices 310-312 listed in the first column, although the noise correlations of wireless communication devices 310-312 could use other configurations. In table 501, WCD 310 has determined a SNR or 42, WCD 311 has determined a SNR of 15, and WCD 312 has determined a SNR of 120. It should be understood that the actual values used in table 501 are merely illustrative, and may vary based upon the units (e.g. decibels, dB, dBm, etc. . . . ), normalized ranges, measured values, or other conditions. Also, as seen in FIG. 3, the distances of each of wireless communication devices 310-312 from base station 330 appear to correlate to a lower or higher SNR, although different factors could influence the SNR, such as localized noise sources, buildings, terrain, weather, or other factors. Since WCD 310 has a SNR of 42 in table 501, the corresponding noise range in table 500 is the 40-49 noise range. The corresponding noise ranges for WCD 311 and WCD 312 can also be determined with the examples shown in tables 501 and 500.

Wireless communication devices 310-312 then select (404) a control cycle associated with the corresponding noise range. As shown in table 500, WCD 310 has a SNR of 42 (table 501) which correlates to a noise range of 40-49 in table 500 that is associated with control cycle 4. The corresponding control cycles for WCD 311 and WCD 312 can also be selected with the examples shown in tables 501 and 500. Wireless communication devices 310-312 also determine (405) data rates associated with their selected control cycles. For example, since WCD 310 has selected control cycle 4, table 500 indicates control cycle 4 has a medium data rate associated therewith. Also, since WCD 311 has selected control cycle 1, a low data rate is associated therewith. Finally, since WCD 312 has selected control cycle 12, a high data rate is associated therewith. The selected control cycles and associated data rates are listed in each row of table 501 associated with WCD 310-312. Thus, in the example correlation table of table 500, lower data rates correspond to noisier conditions, while higher data rates correspond to less noisy conditions. In some examples, the data rates are represented by a modulation scheme, coding rate, encoding method, or other parameters. In further examples, a different encryption scheme or encryption code is associated with each noise level. In yet further examples, multiple noise ranges could be associated with a particular control cycle or data rate.

Once a control cycle has been selected by each of wireless communication devices 310-312, each of wireless communication devices 310-312 can monitor (406) the time slots of the respective selected control cycles for overhead information from base station 330, and ignore (407) time slots and associated overhead information of the non-selected control cycles. In this example, each of wireless communication devices 310-312 select a different control cycle. However, in other examples, some of wireless communication devices 310-312 could select the same or similar control cycles, depending upon the noise levels, noise ranges, correlations, or other factors.

In further examples, loading information for each control cycle could be processed to select a control cycle. The loading information could include information relating to how many other wireless communication devices are presently monitoring overhead communications in a particular control cycle. The loading information could also include information related to a data loading or bandwidth consumption level of each of the control cycles. The loading information could be processed along with the noise levels or noise ranges to select a control cycle. For example, if a control cycle corresponding to a particular noise level also corresponds to a heavily loaded control cycle, another control cycle could be selected. In an example where another control cycle is selected other than the control cycle corresponding to the particular noise level detected by a wireless communication device, the other control cycle may correspond to a control cycle associated with a higher noise level or lower noise level. The associated data rate could also be different when selecting another control cycle, and the wireless communication device should thus select a control cycle with a supportable data rate considering the present noise conditions experienced by the particular wireless communication device.

In yet further examples, a wireless communication device could select a particular control cycle and indicate the selected control cycle to base station 330. Base station 330 could monitor a loading status or loading information for the control cycles, process the loading information for the control cycles to assign the wireless communication device to another one of the control cycles, and wirelessly indicate to the wireless communication device the assigned control cycle. The wireless communication device could then receive the assigned control cycle and subsequently monitor time slots of the assigned control cycle for overhead information from base station 330. Time slots of the non-assigned control cycles could also be ignored by the wireless communication device.

Advantageously, a wireless communication device can select a control cycle or other overhead time cycle based upon processing present noise conditions at the wireless communication device and processing noise levels corresponding to each control cycle. Using the correlation information, wireless communication devices experiencing high noise conditions can be grouped together and assigned to a low data rate, while wireless communication devices experiencing low noise conditions can be grouped together and assigned to a high data rate. This grouping of wireless communication devices according to present signal conditions experienced by the wireless communication devices can lead to more efficient use of wireless communication resources. This can be useful in overhead communication signals and channels, where many wireless communication devices may share overhead resources of a single wireless access node. Additionally, the correlation information could be altered on a case-by-case basis by a wireless communication device or wireless access node if a particular control cycle becomes too crowded, or upon other conditions.

Figure 6:
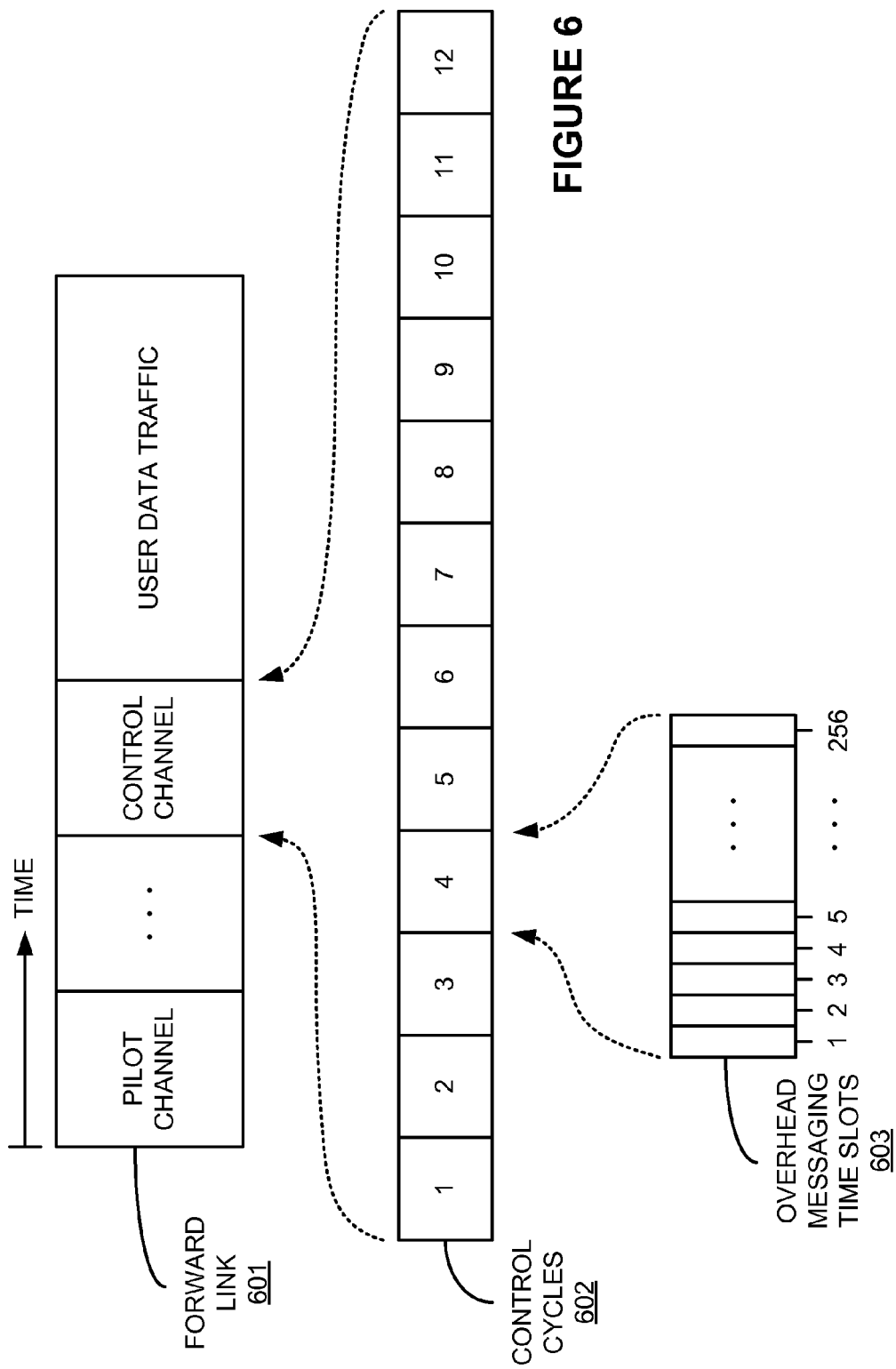
FIG. 6 is a diagram illustrating a forward link in a wireless communication system.

FIG. 6 is a diagram illustrating an example of a forward link portion of wireless links 320-322, as found in FIG. 3, although wireless links 320-322 could use other configurations. Wireless link 120 could also incorporate features of the forward link described in FIG. 6. FIG. 6 illustrates forward link 601, control cycles 602, and overhead messaging time slots 603.

Forward link 601 includes several time-wise portions, with time increasing to the right, as shown by the arrowhead above forward link 601. In forward link 601, a pilot channel, control channel, and user data traffic portion are shown, although additional portions could also be in forward link 601. The forward link sequence is typically repeated continuously to effectuate communication service from base station 330 to WCD 310-312 over wireless links 320-322. In further examples, a reverse link of wireless links 320-322 could exist to facilitate communication service from WCD 310-312 to base station 330. Other examples of forward link 601 could include frequency-wise portions, or other configurations, including combinations thereof.

The pilot channel includes information related to base station 330 and the service provider of communication system 300 used in the registration process of each WCD 310-312. The user data traffic portion includes user communications, such as voice call data, web pages, email, among other information. The control channel includes information related to overhead information of wireless links 320-322 and overhead information of the associated communication services. The control channel could include broadcast portions applicable to all wireless communication devices in communication with base station 330, and portions specific to WCD 310-312 or other wireless communication devices. In some examples, this overhead information includes quick configuration messages, access parameters, or sector parameters. In other examples, the control cycles include paging information for wireless communication devices. The pages could include call alerts, text messages, audio messages, or other information.

In the example shown in FIG. 6, control cycles 602 includes 12 control cycles. Each of the control cycles are distinct, with possibly different content, in the control channel of forward link 601. Also, included in each control cycle 1-12 are overhead messaging time slots 603. In this example, 256 time slots are included in each control cycle 1-12. Each overhead messaging time slot 1-256 includes overhead information.

Since, as described herein, a wireless communication device will be selected by or assigned to a particular control cycle, only the time slots within the assigned control cycle will be monitored by the wireless communication device. Additionally, the individual time slots 1-256 for each control cycle 1-12 could also have information which allows a wireless communication device to determine if the time slot is relevant to the particular wireless communication device. In some cases, some time slots will be broadcast information applicable to many wireless communication devices, while in other cases, some time slots will be intended for a specific wireless communication device. The overhead messaging information as described herein will, in typical examples, be found within the individual time slots.

FIG. 7 is a block diagram illustrating wireless communication device 700, as an example of wireless communication device 110 found in FIG. 1 or WCD 310-312 found in FIG. 3, although wireless communication device 110 or WCD 310-312 could use other configurations. Wireless communication device 700 includes transceiver 710, processing system 720, and user interface 730. Transceiver 710 and processing system 720 communicate over link 740. User interface 730 and processing system 720 communicate over link 741. Transceiver 710 communicates with a wireless access node, omitted for clarity, over wireless link 750. Wireless communication device 700 may be distributed among multiple devices that together form elements 710, 720-722, 730, and 740-741. Transceiver 710 comprises radio frequency (RF) communication circuitry and an antenna. Transceiver 710 could also include amplifiers, filters, modulators, and signal processing circuitry. In this example, transceiver 710 can exchange instructions and information with processing system 720.

Processing system 720 includes storage system 721. Processing system 720 retrieves and executes software 722 from storage system 721. Processing system 720 could incorporate a computer microprocessor, logic circuit, or some other processing device, and may be distributed among multiple processing devices. In some examples, processing system 720 or user interface 730 are located within the same equipment in which transceiver 710 is located. Storage system 721 could include a computer-readable medium such as a disk, tape, integrated circuit, server, or some other memory device, and also may be distributed among multiple memory devices. Software 722 may include an operating system, logs, utilities, drivers, networking software, and other software typically loaded onto a computer system. Software 722 could contain an application program, firmware, or some other form of computer-readable processing instructions. When executed by processing system 720, software 722 directs wireless communication device 700 to operate as described herein.

User interface 730 includes equipment and circuitry for receiving user input and control. Examples of user interface 730 include push buttons, touchscreens, selection knobs, dials, switches, actuators, keys, keyboards, pointer devices, microphones, transducers, potentiometers, non-contact sensing circuitry, or other human-interface equipment. In some examples, user interface 730 also includes equipment to communicate information to a user of wireless communication device 700. Examples of the equipment to communicate information to the user could include indicator lights, lamps, light-emitting diodes, displays, haptic feedback devices, audible signal transducers, speakers, buzzers, alarms, or other indicator equipment, including combinations thereof.

Links 740-741 each comprises a physical, logical, or virtual communication link, capable of communicating data, control signals, and communications, along with other information. In some examples, links 740-741 are each encapsulated within the elements of transceiver 710, processing system 720, or user interface 730, and may each be a software or logical link. In other examples, links 740-741 each use various communication media, such as air, space, metal, optical fiber, or some other signal propagation path, including combinations thereof. Links 740-741 could be direct links or might include various equipment, intermediate components, systems, and networks. Wireless link 750 could use various protocols or communication formats as described herein for wireless links 120 or 320-322, including combinations, variations, or improvements thereof. In this example, wireless link 750 can exchange user communications and overhead communications.

FIGS. 1-7 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device to select an overhead time cycle for the wireless communication device among a series of repeating overhead time cycles associated with a wireless access node, wherein each overhead time cycle comprises a plurality of time slots, and wherein the wireless access node transfers overhead information during individual ones of the time slots, the method comprising:
in the wireless communication device, receiving correlation information for each of the overhead time cycles, wherein the correlation information indicates a noise range associated with each of the overhead time cycles;
in the wireless communication device, determining a noise level at the wireless communication device of wireless communications of the wireless access node;
in the wireless communication device, processing the noise level and the correlation information to select one of the overhead time cycles for the wireless communication device;
in the wireless communication device, indicating the selected one of the overhead time cycles to the wireless access node; and
in the wireless communication device, monitoring the time slots of the selected one of the overhead time cycles for the overhead information from the wireless access node, and ignoring the time slots during the non-selected overhead time cycles.

2. The method of claim 1, wherein processing the noise level and the correlation information to select the one of the overhead time cycles comprises processing the noise level to determine one of the noise ranges corresponding to the noise level, and selecting the overhead time cycle associated with the corresponding noise range.

3. The method of claim 1, wherein the correlation information for each of the overhead time cycles further comprises a data rate for the overhead communications transferred during each of the overhead time cycles.

4. The method of claim 3, wherein lower data rates correspond to higher noise ranges of the correlation information, and wherein higher data rates correspond to lower noise ranges of the correlation information.

5. The method of claim 1, wherein the noise level at the wireless communication device of the wireless communications of the wireless access node comprises a signal-to-noise ratio of forward link communications of the wireless access node.

6. The method of claim 1, wherein the correlation information for each of the overhead time cycles further comprises loading information for each of the overhead time cycles; and
wherein processing the noise level and the correlation information to select the one of the overhead time cycles comprises processing the noise level to determine to which of the noise ranges the noise level corresponds, and selecting the overhead time cycle associated with the corresponding noise range.

7. The method of claim 6, further comprising:
processing the loading information to determine if another overhead time cycle should be selected, and selecting another overhead time cycle if the loading information indicates the selected overhead time cycle associated with the corresponding noise range is overloaded.

8. The method of claim 1, further comprising:
wherein responsive to the wireless communication device indicating the selected one of the overhead time cycles to the wireless access node, the wireless access node monitors loading information for the overhead time cycles, processes the loading information for the overhead time cycles to assign the wireless communication device to another one of the overhead time cycles, and wirelessly indicates the assigned one of the overhead time cycles to the wireless communication device;
in the wireless communication device, receiving the assigned one of the overhead time cycles; and
in the wireless communication device, monitoring the time slots of the assigned one of the overhead time cycles for the overhead information from the wireless access node, and ignoring the time slots during the non-assigned one of the overhead time cycles.

9. The method of claim 1, wherein the overhead time cycles are control cycles within a control channel of a code-division multiple access (CDMA) forward wireless link.

10. The method of claim 1, wherein the overhead information is at least quick configuration messages, access parameter messages, and sector parameter messages of control cycles within a control channel of a code-division multiple access (CDMA) forward wireless link.

11. A wireless communication device configured to select an overhead time cycle for the wireless communication device among a series of repeating overhead time cycles associated with a wireless access node, wherein each overhead time cycle comprises a plurality of time slots, and wherein the wireless access node transfers overhead information during individual ones of the time slots, the wireless communication device comprising:

a transceiver configured to receive correlation information for each of the overhead time cycles, wherein the correlation information indicates a noise range associated with each of the overhead time cycles;

a processing system configured to determine a noise level at the wireless communication device of wireless communications of the wireless access node, and process the noise level and the correlation information to select one of the overhead time cycles for the wireless communication device;

the transceiver configured to indicate the selected one of the overhead time cycles to the wireless access node; and wherein the transceiver is configured to monitor the time slots of the selected one of the overhead time cycles for the overhead information from the wireless access node, and ignore the time slots during the non-selected overhead time cycles.

12. The wireless communication device of claim 11, wherein the processing system is configured to process the noise level to determine one of the noise ranges corresponding to the noise level, and select the overhead time cycle associated with the corresponding noise range.

13. The wireless communication device of claim 11, wherein the correlation information for each of the overhead time cycles further comprises a data rate for the overhead communications transferred during each of the overhead time cycles.

14. The wireless communication device of claim 13, wherein lower data rates correspond to higher noise ranges of the correlation information, and wherein higher data rates correspond to lower noise ranges of the correlation information.

15. The wireless communication device of claim 11, wherein the noise level at the wireless communication device of the wireless communications of the wireless access node comprises a signal-to-noise ratio of forward link communications of the wireless access node.

16. The wireless communication device of claim 11, wherein the correlation information for each of the overhead time cycles further comprises loading information for each of the overhead time cycles; and wherein the processing system is configured to process the noise level to determine to which of the noise ranges the noise level corresponds, and select the overhead time cycle associated with the corresponding noise range.

17. The wireless communication device of claim 16, wherein the processing system is configured to process the loading information to determine if another overhead time cycle should be selected, and select another overhead time cycle if the loading information indicates the selected overhead time cycle associated with the corresponding noise range is overloaded.

18. The wireless communication device of claim 11, comprising:

wherein responsive to the transceiver indicating the selected one of the overhead time cycles to the wireless access node, the wireless access node monitors loading information for the overhead time cycles, processes the loading information for the overhead time cycles to assign the wireless communication device to another one of the overhead time cycles, and wirelessly indicates the assigned one of the overhead time cycles to the wireless communication device; and the transceiver configured to receive the assigned one of the overhead time cycles, monitor the time slots of the assigned one of the overhead time cycles for the overhead information from the wireless access node, and ignore the time slots during the non-assigned one of the overhead time cycles.

19. The wireless communication device of claim 11, wherein the overhead time cycles are control cycles within a control channel of a code-division multiple access (CDMA) forward wireless link.

20. The wireless communication device of claim 11, wherein the overhead information is at least quick configuration messages, access parameter messages, and sector parameter messages of control cycles within a control channel of a code-division multiple access (CDMA) forward wireless link.

* * * * *